(12) United States Patent
Tolmachev (10) Patent No.: US 7,935,655 B2
(45) Date of Patent: May 3, 2011

(54) NANOSTRUCTURED CORE-SHELL ELECTROCATALYSTS FOR FUEL CELLS

(75) Inventor: Yuriy Viacheslavovich Tolmachev, Kent, OH (US)

(73) Assignee: Kent State University, Kent, OH (US)

( * ) Notice: Subject to any disclaimer, the term of this patent is extended or adjusted under 35 U.S.C. 154(b) by 1565 days.

(21) Appl. No.: 11/267,737

(22) Filed: Nov. 4, 2005

(65) Prior Publication Data

US 2007/0105005 A1 May 10, 2007

(51) Int. Cl.
*B01J 23/00* (2006.01)
*B01J 21/00* (2006.01)

(52) U.S. Cl. ........ 502/326; 502/327; 502/332; 502/333; 502/334; 502/339; 502/355; 502/439; 502/527.19

(58) Field of Classification Search .................. 502/326, 502/327, 332, 333, 334, 339, 355, 439, 527.19; 429/30, 44
See application file for complete search history.

(56) References Cited

U.S. PATENT DOCUMENTS

| | | | | |
|---|---|---|---|---|
| 6,403,245 | B1 * | 6/2002 | Hunt | 429/33 |
| 6,723,388 | B2 * | 4/2004 | Svendsen et al. | 427/526 |
| 6,869,671 | B1 * | 3/2005 | Crouse et al. | 428/304.4 |
| 6,902,653 | B2 * | 6/2005 | Carmignani et al. | 204/157.15 |
| 7,125,822 | B2 * | 10/2006 | Nakano et al. | 502/339 |
| 7,157,177 | B2 * | 1/2007 | Chan | 429/44 |
| 7,326,487 | B2 * | 2/2008 | Chang | 429/40 |
| 7,351,444 | B2 * | 4/2008 | Wang et al. | 427/115 |
| 7,545,010 | B2 * | 6/2009 | Ichihara et al. | 257/414 |
| 7,615,829 | B2 * | 11/2009 | Lochtefeld et al. | 257/377 |
| 7,691,780 | B2 * | 4/2010 | Adzic et al. | 502/339 |
| 2001/0041277 | A1 * | 11/2001 | Chang | 429/30 |
| 2003/0118743 | A1 * | 6/2003 | Svendsen et al. | 427/487 |
| 2003/0150707 | A1 * | 8/2003 | Carmignani et al. | 204/157.3 |
| 2004/0121219 | A1 * | 6/2004 | Mei et al. | 429/40 |
| 2004/0197609 | A1 * | 10/2004 | Kurtz | 429/12 |
| 2004/0234841 | A1 * | 11/2004 | Yoshitake et al. | 429/44 |
| 2004/0247989 | A1 * | 12/2004 | Legzdins et al. | 429/44 |
| 2005/0053826 | A1 * | 3/2005 | Wang et al. | 429/44 |
| 2005/0100779 | A1 * | 5/2005 | Gertner | 429/42 |
| 2005/0112450 | A1 * | 5/2005 | Wang et al. | 429/44 |
| 2005/0271928 | A1 * | 12/2005 | Ovshinsky et al. | 429/40 |
| 2006/0002844 | A1 * | 1/2006 | Suenaga et al. | 423/447.3 |
| 2006/0093892 | A1 * | 5/2006 | Min et al. | 429/40 |
| 2006/0172179 | A1 * | 8/2006 | Gu et al. | 429/44 |
| 2006/0201801 | A1 * | 9/2006 | Bartlett et al. | 204/284 |
| 2007/0048588 | A1 * | 3/2007 | Abd Elhamid et al. | 429/38 |
| 2007/0054798 | A1 * | 3/2007 | Ruud et al. | 502/101 |
| 2007/0108052 | A1 * | 5/2007 | Luongo et al. | 204/431 |
| 2007/0140946 | A1 * | 6/2007 | Gabriel et al. | 423/447.1 |
| 2007/0197379 | A1 * | 8/2007 | Miura | 502/304 |
| 2008/0057369 | A1 * | 3/2008 | Kurtz | 429/29 |
| 2009/0169951 | A1 * | 7/2009 | Suenaga et al. | 429/30 |
| 2010/0075827 | A1 * | 3/2010 | Pellin et al. | 502/4 |

* cited by examiner

*Primary Examiner* — Cam N Nguyen
(74) *Attorney, Agent, or Firm* — Fay Sharpe LLP (57) ABSTRACT

Catalytic layers for use in the electrodes of fuel cells including a non-noble metal substrate layer coated with one or a few monolayers of noble metal, such as Pt. These thin, highly porous structures with large catalytically active surface areas, should exhibit a significantly higher power output per mg of Pt and per $cm^2$ of the membrane than the current Polymer Electrolyte Fuel Cells catalytic layers.

12 Claims, 7 Drawing Sheets

NANOSTRUCTURED CORE-SHELL ELECTROCATALYSTS FOR FUEL CELLS

BACKGROUND

The present exemplary embodiments relate to nanostructured catalyst layers. It finds particular application in conjunction with Polymer Electrolyte Fuel Cells (PEFCs), and will be described with particular reference thereto. However, it is to be appreciated that the present exemplary embodiment is also amenable to other like applications.

Polymer Electrolyte Fuel Cells (PEFCs) are usually fueled with hydrogen or methanol. The hydrogen-air fuel cell (HAFC) is currently considered as the power source of choice for vehicular applications thanks to its superb power density, lifetime and short start-up time. Due to problems with hydrogen storage, another type of PEFC, Direct Methanol Fuel Cell (DMFC), is also investigated for portable and vehicular applications. DMFCs have already entered the market for portable applications, such as military radio stations and laptop computers.

Since PEFCs typically operate at temperatures below 100° C., they require catalysts to achieve practically meaningful power density, particularly in the case of oxygen reduction (ORR) and methanol oxidation (MOR) reactions. Currently, all catalysts used in PEFCs are platinum-based. The current state-of-the-art PEFCs use 0.2-0.4 mg/cm$^2$ of Pt for air cathode, 0.05 mg/cm$^2$ of Pt for hydrogen anode, 0.2 mg/cm$^2$ of Pt+Ru for reformate gas ($H_2$+100 ppm CO) anode, and 4.0 mg/cm$^2$ of Pt+Ru for methanol anode, and the reported performances at 80-100° C. with 1 atm of air are ca. 0.35-1 g/kW for pure hydrogen-fed HAFC, and 20-80 g/kW for DMFC. Published analyses for different types of automotive HAFCs estimate the cost of catalyst as 50-250 $/kW or 20-35% of the fuel cell stack cost. These numbers alone are higher than the 2015 DOE's goals for the complete fuel cell power plant including hydrogen storage, i.e. $30/kW, which is cost competitive the internal combustion engine technology. The situation looks even less promising in the case of automotive DMFCs.

The high cost of PEFCs is not the only problem that impedes their broad use; the scarcity of Pt metal is even a larger concern. Current fuel cell powered automobiles require ca. 60 g of Pt compare to 2-5 g of Pt for internal combustion engine vehicles. According to various estimates, Pt production will be able to meet the demand of projected FCA market growth, only if the required amount of Pt is reduced 4-5 fold, to 15 g/vehicle or to 0.2 g/kW by 2015 and to lower values later. An even more drastic requirement a 10-fold reduction of Pt loading, was proposed as a necessary condition for a large-scale market penetration of automotive fuel cells by a Nissan researcher. M. Arita; *Technical Issues of Fuel Cell Systems for Automotive Applications*. Fuel Cells 2 (2002) 10-14.

The commercial viability of Polymer Electrolyte Fuel Cells (PEFCs) for large-market applications requires, among other factors, a substantial reduction of platinum metals loading. The state-of-the-art design of the catalytic layer in PEFCs based on carbon-supported ca. 3 nm Pt nanoparticles suffers from three main drawbacks. The first is a poor utilization of Pt nanoparticles, since 25-50% of catalyst particles are buried in carbon agglomerates and, therefore, are not accessible to reactants or protons. The second drawback is a large fraction (50-60%) of subsurface Pt atoms, which do not participate in electrocatalysis. The third is the significant thickness of the catalytic layer (ca. 10 μm), which prevents efficient mass-transport throughout the layer.

Proposed herein is a conceptually new design of the catalytic layer based on recently developed nanofabrication principles.

BRIEF DESCRIPTION

In accordance with one aspect of the present exemplary embodiments, there is provided a catalyst layer for use in fuel cells, the catalyst layer including a nanoporous substrate and a surface layer of a different material.

In accordance with a second aspect, there is provided a fuel cell including an ion exchange membrane positioned between first and second porous catalyst layers and first and second electrodes, each of the catalyst layers including a nanoporous substrate and a surface layer of a different material.

In a third aspect, there is provided a membrane-electrode assembly including a proton conducting polymer membrane separating two porous electrodes, and positioned between two porous catalyst layers, each of the catalyst layers including a nanoporous substrate and a surface layer of a different material.

In a fourth aspect, there is provided a method for preparing a fuel cell including the steps of: providing first and second electrodes; positioning an ion conducting membrane between the electrodes; and disposing first and second porous catalyst layers on opposing surfaces of the membrane, each of the catalyst layers including a nanoporous substrate and a surface layer of a different material.

DETAILED DESCRIPTION

In order to give the reader a better understanding of the proposed design, we will review briefly the historical development and the current designs of the PEFC catalytic layers.

Figure 1:
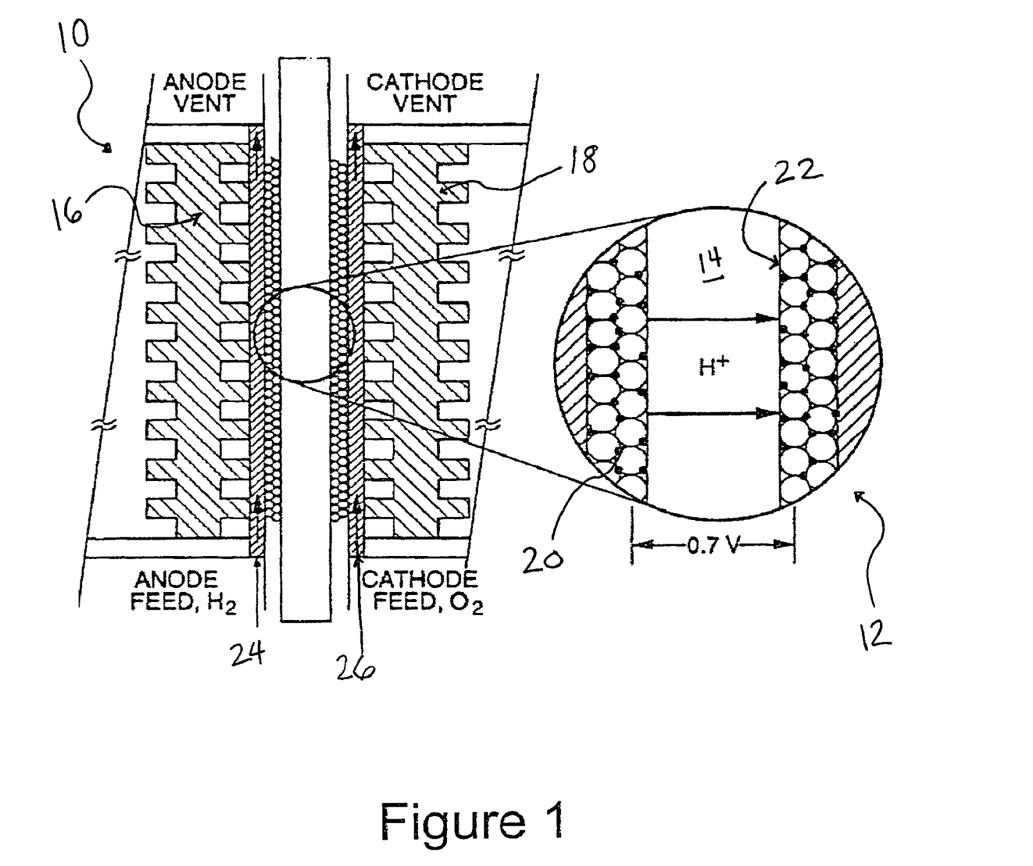
FIG. 1 is a schematic diagram of a single stack HAFC cross-section. The zoomed view shows the MEA.

FIG. 1 shows a schematic diagram of a single stack of a conventional HAFC 10. The heart of the PEFC is a Membrane-Electrode Assembly (MEA) 12, which includes an ion-conducting layer 14 separating an anode and a cathode 16, 18 coated with catalytic layers 20, 22, and sandwiched between two gas diffusion layers 24, 26. Although not intended to be limiting as other electrolytes are also useful in the present embodiments, an exemplary ion-conducting membrane for use herein is Nafion®. Nafion® is a perfluorinated polymer available from DuPont containing a certain proportion of sulfonic acid functional groups and having the general structure below, with H⁺ being the counter ion:

Structural optimization of all MEA components is important for maximizing the power density of a fuel cell, but, since precious metals are used only in the catalytic layer, this component is the most relevant for the present discussion. Since the structures of air cathode, hydrogen, and liquid methanol anodes are in many ways similar, we will focus mostly on the former, since it is common to all types of PEFC and because it consumes 80% or more of the total Pt in HAFC.

Figure 2:
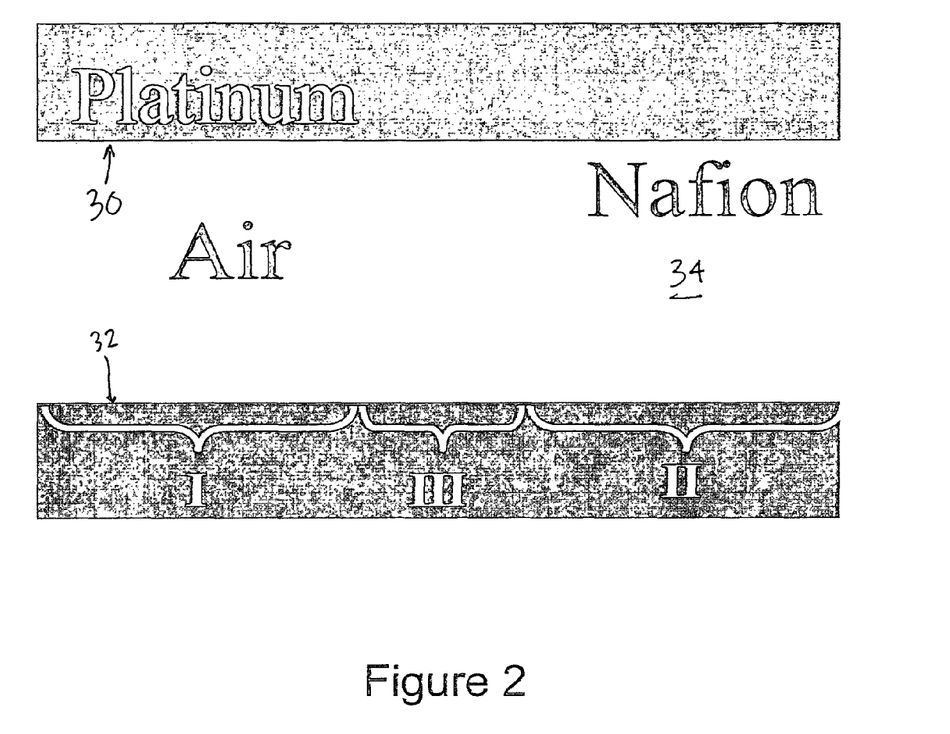
FIG. 2 is a microscopic single pore model of the catalytic layer in a fuel cell.

Electrochemical reactions in PEFCs require the presence of a catalyst, electrons, protons and reactants. As a result, they occur only in a three-phase zone where catalyst, electron conductor, polymer electrolyte, and gas channels meet. This point is illustrated in FIG. 2, which shows a single pore with catalytic walls 30, 32 partially filled with electrolyte 34 (in this case Nafion®)). In this figure, the Pt wall surface, which is in contact with air does not participate in catalysis, because there is no electrolyte to transport ions to and from region I (More recent studies show that protons can be transported via surface diffusion on Pt, yet not fast enough to sustain large current densities over 0.1 μm away from the interface). Deep inside the Nafion-filled pore (region II) the current density is also small, since the supply of the reactant via diffusion through the electrolyte is slow.

As can be seen from FIG. 2, there are two ways to improve the utilization of the catalyst: by localizing the catalyst only in a thin region (III) of the pores at the interface between electrolyte and gas, and by reducing the amount of catalyst buried under the first surface layer. Historically, the advancements in the reduction of precious catalyst loading in PEFCs targeted both approaches, yet neither of them has been pushed to the limit.

Figure 3:
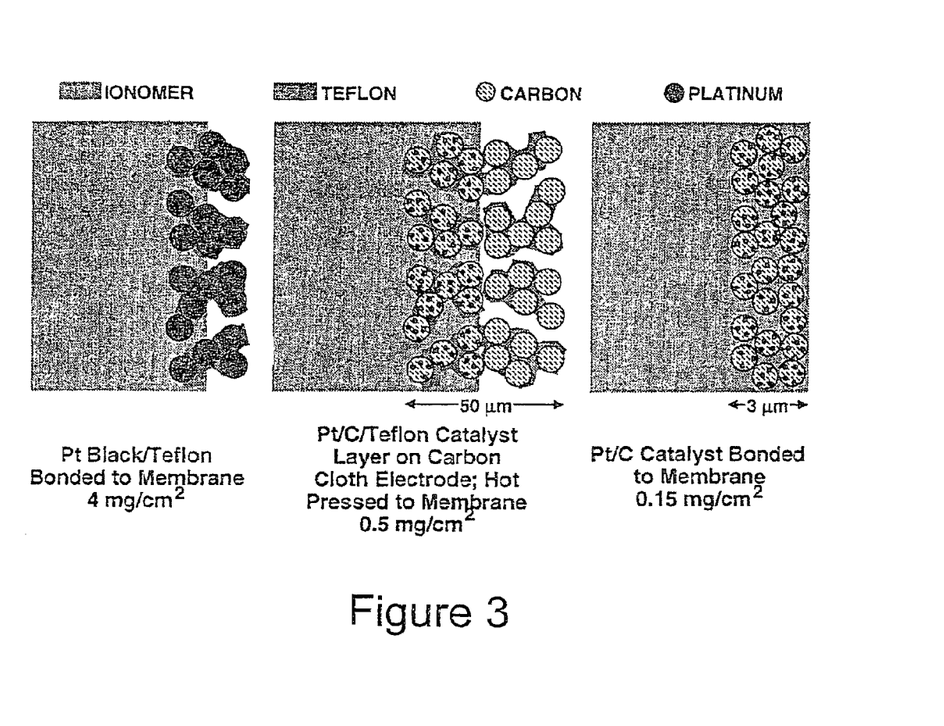
FIG. 3 are three historical types of PEFC electrodes.

The PEFC electrodes developed by General Electric for NASA in the 1960's as shown in FIG. 3 (left) were prepared by random mixing of about 10-20 nm Pt catalyst particles (which also provide electronic conductivity) and Teflon (which forms pores filled with gaseous reactant) in contact with Nafion membrane (which provides ionic conductivity). Typical Pt loading was 4 mg/cm², and the maximal power, when operated on H₂ and air, was 0.1 W/cm², yielding 40 g Pt/kW value.

The first significant improvement in reduction of Pt loading (down to 0.4 mg/cm² and 4 g Pt/kW) came from Los Alamos National Laboratory (LANL) in the 1980's when both the use of Pt supported on carbon particles and impregnation of the catalyst layer with Nafion were proposed (FIG. 3, middle). The carbon support allowed the use of smaller Pt particles (3 nm) with a larger surface-to-volume ratio. The impregnation with Nafion allowed the extension of the three-phase zone over larger thickness. Yet, such electrodes still suffered from (i) poor Pt utilization (20-25% by cyclic voltammetry, CV), since many catalytic particles were not in contact with electrolyte, and (ii) from the large thickness (100, and later 50 μm), which prevented fast reactant transport throughout the catalytic layer.

The second major improvement also came from LANL in the early 1990s (U.S. Pat. No. 5,234,777), when thin-layer electrodes consisting of carbon supported Pt particles mixed with Nafion were proposed (FIG. 3, right). These electrodes do not contain Teflon, and, thus, have a smaller volume fraction of gas-filled channels (recently estimated as 4% based on the partially flooded agglomerate model for the cathode) that surround unutilized Pt particles. This allowed for an increase in Pt CV utilization to 50-75%. Since these electrodes are significantly thinner (5-10 μm), the mass transfer of the gas reactants is more efficient and the ohmic resistance is reduced. Numerous advancements of this design have been reported by other groups with the resulting state-of-the-art performance 0.7 W/cm² or 0.35 g Pt/kW with 0.05 mg/cm² of Pt on the hydrogen electrode and 0.2 mg/cm² on the air electrode.

Recently several groups reported further reduction in the Pt loading using sputter or pulsed laser deposited catalyst. These studies showed that such electrodes with 0.017 mg/cm² Pt loading perform as well as the conventional electrodes with 0.4 mg/cm² Pt loading in the case of H₂ anodes, and that methanol anode performance can reach 0.5 g/kW. The cathode Pt loading can reportedly be reduced from 0.4 to 0.1 and even to 0.04 mg/cm² without a significant sacrifice in performance. The conclusions that emerged from these results are: (i) that it is possible to decrease the catalytic layer thickness down to 10 nm without performance degradation, and (ii) that the introduction of Nafion is not necessary for such thin continuous Pt layers. The first observation can be explained by the fact that the reaction layer in porous electrodes at practical current densities extends only to few nm (see below). The second observation can be attributed to the surface diffusion of hydrogen and other intermediates on Pt.

Sputter-deposited electrodes, despite their impressive performance, are far from the ideal. They still have a significant fraction of Pt atoms buried under the surface, and their preparation route does not allow for much flexibility in making optimized 3D porous nanostructures. The present embodiments propose to solve these issues using recently developed nanofabrication methods.

The present designs use, for example, a non-noble metal rather than carbon as a support or substrate for Pt. While non-noble metals will be used in the discussion of the substrate herein, it is possible that other, non-metal materials may be used to form the substrate as well.

The morphology and thickness of the substrate skeleton can be designed in order to optimize the mass-transport properties. The nature of the support material is selected on the basis of cost, ease of preparation of nanostructures, corrosion resistance, adhesion to the catalytic shell, and promoting activity in electrocatalysis. Such thin, highly porous structures with large catalytically active surface areas, according to a presented prophetic example, exhibit a significantly higher power output per mg of Pt and per cm² of the membrane than the current PEFC catalytic layers.

The present embodiments suggest a replacement in fuel cell electrodes of carbon-supported Pt nanoparticles for nanostructured non-noble metal supports coated with one or a few monolayers of a catalytic noble metal. The possible non-noble metal substrates are chosen based on their cost, corrosion stability, promoting effect in electrocatalysis, the ease of fabrication of nanostructures from these materials and adhesion energy of the catalytic shell material. Candidates may include but not limited to Fe, Co, Ni, Cr, Ti and other first row transition metals, valve metals or coinage metals or a combination thereof. The noble shell material may be platinoid, and is preferably Pt. The embodiments will be described using Pt as an exemplary metal, but it should be noted that the discussion and embodiments may apply to other platinoid metals as well, or possibly to other metal and non-metal materials. The nanostructures include nanoparticles, nanowires, honeycombs, and inverse opals. The thickness of the catalytic layer is preferably 0.1-10 μm, and the characteristic pore size is preferably 3-300 nm, more preferably 15-150 nm.

Useful in the practice of the present embodiments is the method of preparation of conformal coating of a noble metal on a non-noble substrate. One method proposed for this purpose is Atomic Layer Deposition (ALD).

The impact of the present embodiments is the development of a technology allowing for a 5-10 fold reduction of Pt loading per kW in PEFCs, and, potentially, reaching the ultimately best design of the catalytic layer for the three most important types of PEFC electrodes: air cathode, hydrogen anode, and liquid-fed methanol anode. It is believed that the present concept has the potential of meeting the 2015 DOE goal for Pt load reduction in automotive fuel cells.

The elimination of Pt atoms in the bulk of catalyst particles is mandatory for the next generation of electrocatalysts. So far, the research in this direction has been aimed at decreasing the particle size. Yet, such approaches face limitations for particles smaller than 1-3 nm (where there is still as much as 60% of the Pt atoms wasted in the bulk) due to a decrease in the surface specific catalytic activity and due to the problems with preparation and stability of small Pt particles even on carbon supports. The use of metal supports allows one to prepare monolayers of Pt without agglomeration, i.e., to form core-shell catalysts. In addition to reducing the amount of bulk Pt, the use of metal supports may promote the activity of surface Pt, as in the case of Pt-Ni catalysts in oxygen reduction reactions, methanol oxidation reactions, and reform gas ($H_2$+CO) oxidation. The elimination of the carbon support has three more advantages: (i) it precludes the burying the catalysts particles inside agglomerates of carbon particles, (ii) it results in a larger active surface area at a given thickness of the catalytic layer, and (iii) it creates the possibility of proton transfer by surface diffusion on Pt by extending the three-phase zone into the gas-catalyst interface.

All the previously described gains achieved by a core-shell atomic design may be lost at high current densities if only a very small fraction of catalyst has a sufficiently fast supply of reactants and protons. This calls for a proper 3D design of the catalytic layer at the nanoscale level, which minimizes electric and mass-transport resistances. A simple assembly of core-shell nanospheres in the catalytic layer may not provide suitable results because (i) some catalytic particles may end up outside of the percolating cluster, (ii) because the electronic resistance of the cluster may be high due to numerous particle-particle contacts, and (iii) because the reactant and proton transfer in such low porosity and high tortuosity structure is inefficient. Structures with highly porous interpercolating continuous networks of catalyst and electrolyte/gas pores present better opportunities. We will start our analysis with the core-shell honeycomb structure shown in FIG. 4.

PROPHETIC EXAMPLES

Figure 4:
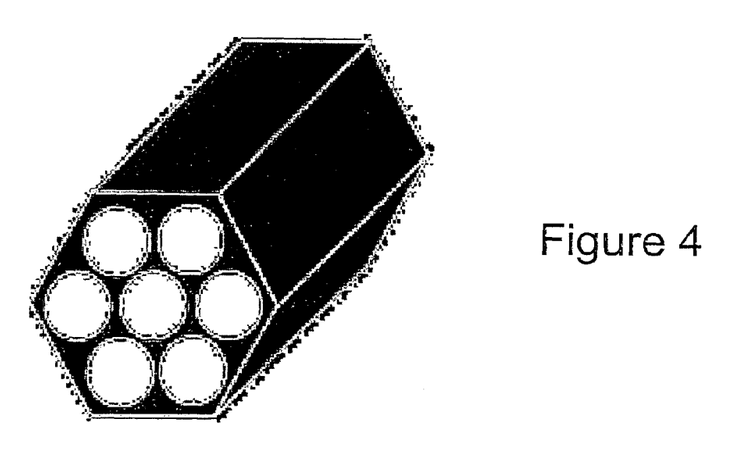
FIG. 4 is a honeycomb catalytic layer structure.

Table 1 below compares estimated properties of the proposed honeycomb catalytic layer, having all pores oriented perpendicular to the membrane plane, with experimental data for a current state-of-the-art design. We used this type of electrode, since the calculations are the most simple for this geometry. The calculations were performed for air-fed cathodes with the pore diameter of 30 nm, wall thickness of 5 nm and three different layer thicknesses: 0.1, 1 and 10 μm. The effects of water and proton transport were ignored in the calculations. The HAFC powers at 0.2 A/cm² and at 0.6 V are used in this comparison.

As can be seen from Table 1, the ratio of surface-to-total Pt atoms is 3-5 times higher for the proposed design due to a better surface dispersion and utilization of Pt. This number means 3-5 times higher current density at high operating voltages. These calculation do not take into account the promoting enhancement by the substrate (up to 4 times), which may be degraded in practice by the need to deposit multilayer Pt shell. When these factors are considered, the estimates for the proposed design yield the potential at 0.2 A/cm² for 0.051 mg/cm² Pt loading about 80 mV higher than that for the current electrodes with 0.2-0.4 mg/cm² of Pt, which translates into 4-8 fold reduction of Pt loading per kW.

We used the Thiele model of reaction kinetics in a Nafion-filled cylindrical pore (without considering the top flat part of the catalytic layer) to estimate the geometric current density at 0.6 V for an air-fed electrode. Since the reaction layer is confined to 4.2 nm depth, electrodes of different thicknesses yield the same current of 2.2 A/cm².

Even though this current density is approximately 5 times higher than for the state-of-the-art HAFC anodes at the same potential, the utilization of the catalyst is rather poor, as the reaction layer does not go deep into the pore. Fortunately, our catalytic layers may require only partial pore filling with Nafion® or other ion exchange resin and still have 100% surface utilization. This is due to the fact that reactive species can be transported via surface diffusion on Pt over more than 0.1 μm. Such effect does not occur with conventional electrodes, where Pt nanoparticles are separated by carbon support.

We calculated, using the Thiele model again, the geometric current densities for the extreme case of completely gas filled pores, taking roughly into account binary and Knudsen diffusion effects for $O_2$ transport in air-filled nanopores. The estimate shows that the reaction layer in this case extends to 650 nm and that mass-transport limitations in the catalytic layer do not occur under such conditions. Note that even if we assume that for a half-filled pore the current is half of the one calculated for a completely gas-filled pore, and the ionic resistance is twice that of the all-Nafion® pore, the ohmic losses in the 0.1 μm layer are only 30 mV.

In practice, the membrane resistance and gas-diffusion layer flooding are likely to limit the performance at current densities over 1-2 A/cm². For a 0.1 μm layer, 2 A/cm² will be reached at 768 mV. If we subtract from this number a 0.1V loss due to the resistance of 50 μm Nafion® membrane, we will obtain a power of 1.34 W/cm² or loading of 0.07 g of Pt/kW, if both HAFC electrodes are 0.1 μm thick and anode losses are negligible.

Thus, it appears that the present catalytic layer design should allow for 5-10 fold reduction of the amount of Pt per kW power for HAFC at both low and high currents, as well as for Pt+Ru DMFC anodes. At low currents this reduction is due to a better dispersion and utilization of the three-phase zone, and at high currents it is due to an improved mass-transport of reactant gases and protons in the thin porous layer. We also have discovered that 0.1-1 μm thick electrodes can provide the best Pt/kW savings, and that the pore-filling with electrolyte may not be necessary at such thicknesses.

TABLE 1

Calculated parameters for the proposed catalytic layer design (FIG., 4, with 30 nm pore diameter and 5 nm pore wall) of various thicknesses and experimental parameters for the current state-of-the-art PEFC cathodes.

| Parameter | 0.1 μm thick | 1 μm thick | 10 μm thick | Current electrodes |
|---|---|---|---|---|
| Roughness factor | 12.1 | 119 | 1185 | 200-400 |
| Pt loading, mg/cm$^2$ | 0.051 | 0.503 | 5.02 | 0.2-0.4 |
| Surface/total Pt atoms | 100% | 100% | 100% | 41% |
| CV utilization of surface Pt | 100% | 100% | 100% | 50-75% |
| Active Pt/total Pt[a] | 100% | 100% | 100% | 20-30% |
| g of active Pt/cm$^2$ | 0.051 | 0.503 | 5.02 | 0.04-0.12 |
| air-fed anode potential at 0.2 A/cm$^2$ | 843 mV | 903 mV | 963 mV | 765 mV |
| Power density at 0.2 A/cm$^2$, W/cm$^2$ | 0.169 | 0.181 | 0.193 | 0.155 |
| g of Pt/kW at 0.2 A/cm$^{2\,b}$ | 0.30 | 2.8 | 26 | 1.3-2.6 |
| Geometric current density at 0.6 V for Nafion-filled pores, A/cm$^2$ | 2.2[c] | 2.2[c] | 2.2[c] | 0.43[d] |
| Geometric current density at 0.6 V for air-filled pores, A/cm$^2$ | 243[e] | 1.464[e] | 1,606[e] | |
| Ionic resistance, mΩ/cm$^2$ | 0.11 | 1.1 | 11 | 20[f] 100-200[g] |
| g of Pt per kW at maximal power[b] | 0.035[h] | | | 0.26-0.56 |

[a]Surface/total Pt atoms × CV utilization of surface Pt
[b]this number includes only cathode Pt loading. Anode Pt should increase this value by 10-30%.
[c]Calculated using Thiele model for an air feed with extrapolated kinetic current 21 A/cm$^2$, and O$_2$ solubility and diffusion coefficients from K. Lee, A. Ishihara, S. Mitsushima, N. Kamiya, K. Ota., Effect of recast temperature on diffusion and dissolution of oxygen and morphological properties in recast Nafion. J. Electrochem. Soc. 151 (2004) A639-A645.
[d]State-of-art data from S. Litster, G. McLean. PEM fuel cell electrodes. J. Power Sources 130 (2004) 61-76. with air cathode corrected for membrane resistance
[e]Calculated using Thiele model with binary (0.21 O$_2$+ 0.79 N$_2$) diffusion and Knudsen corrections for effective diffusion coefficient but without convective effect (see text for details).
[f]theoretical resistance for 10 μm Nafion layer with conductivity 0.1 Sm/cm and 0.5 porosity.
[g]experimental resistance including particle-to-particle contact and O$_2$ transport at ca. 0.6 V with pure oxygen feed.
[h]estimated for 2 A/cm$^2$, as explained in the text.

Proposed Designs of the Catalytic Layers

While sufficient, the honeycomb structure discussed above has a relatively low surface-to-volume ratio and does not have an interconnected pore network, which may cause an inefficient use of catalysts if some pores are clogged, as in the case of electrode flooding. Several other structures, like those shown in FIG. 5, may offer better performance.

Figure 5:
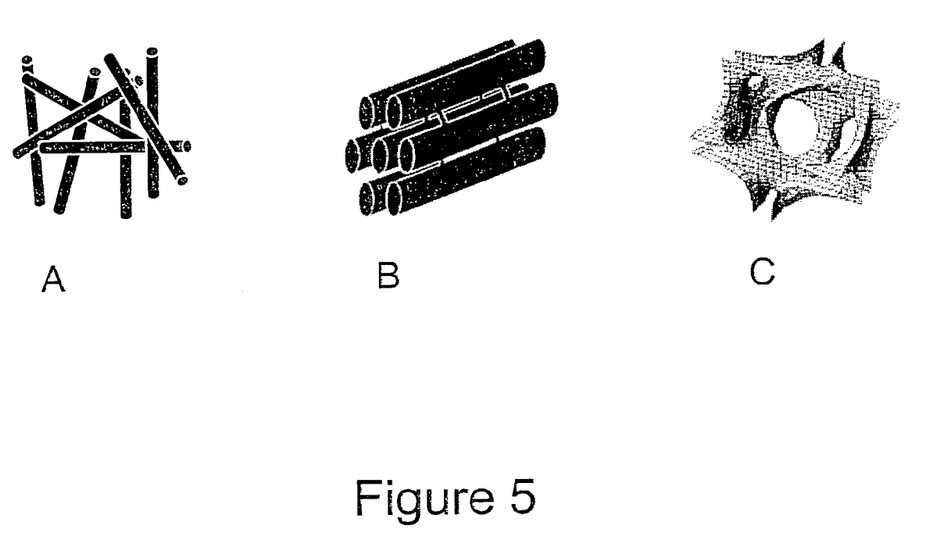
FIG. 5 are a few possible structures of a catalyst layer. Dark represents the core-shell skeleton, white represents the voids. Typical feature size is 5-50 nm.

Structure A is composed of randomly arranged core-shell nanowires. Its biggest advantage is the ease of fabrication and of porosity variation. The disadvantage is the difficulty in controlling the exact structure, which makes it less suitable for optimization and model studies. Ordered structure B, with rigidly connected hexagonally packed parallel nanowires, is free of these problems, but it can only be produced, using known nanofabrication procedures, in a small range of dimensions and with a low porosity. Structure C, an inverse opal, which can be prepared by depositing the core metal into an ordered assembly of silica or polymer nanospheres, provides the greatest dimensional flexibility, as well as superior mass-transfer properties.

An increase in the pore size at a constant thickness of the catalytic layer is beneficial for the mass-transport, yet at the same time the catalytically active surface area (Pt roughness factor) decreases. Our estimates show that the optimal pore size for 0.1-1 μm thick catalytic layers lies between 5 and 50 nm, depending on the assumptions about proton and reactant transport.

In the following section we present the proposed routes to fabricate the structure in FIG. 5A and methods of its characterization.

Preparation of Ni Core Nanowires

We selected Ni as the core substrate for this work since it shows promotion in the catalytic activity of Pt in oxygen reduction, methanol and for reformate gas (H$_2$+CO) oxidation, and because preparation techniques for Ni nanostructures are well established. Nevertheless, other metals may be used as discussed above.

One can obtain or fabricate 15-60 nm diameter×5-15 μm length nanowire cores (FIG. 5A) by electroplating Ni into nanoporous alumina or polymer membrane templates. The porous alumina substrate allows for fabrication of a larger number wires in one step and the lengths of the wires are larger.

Figure 6:
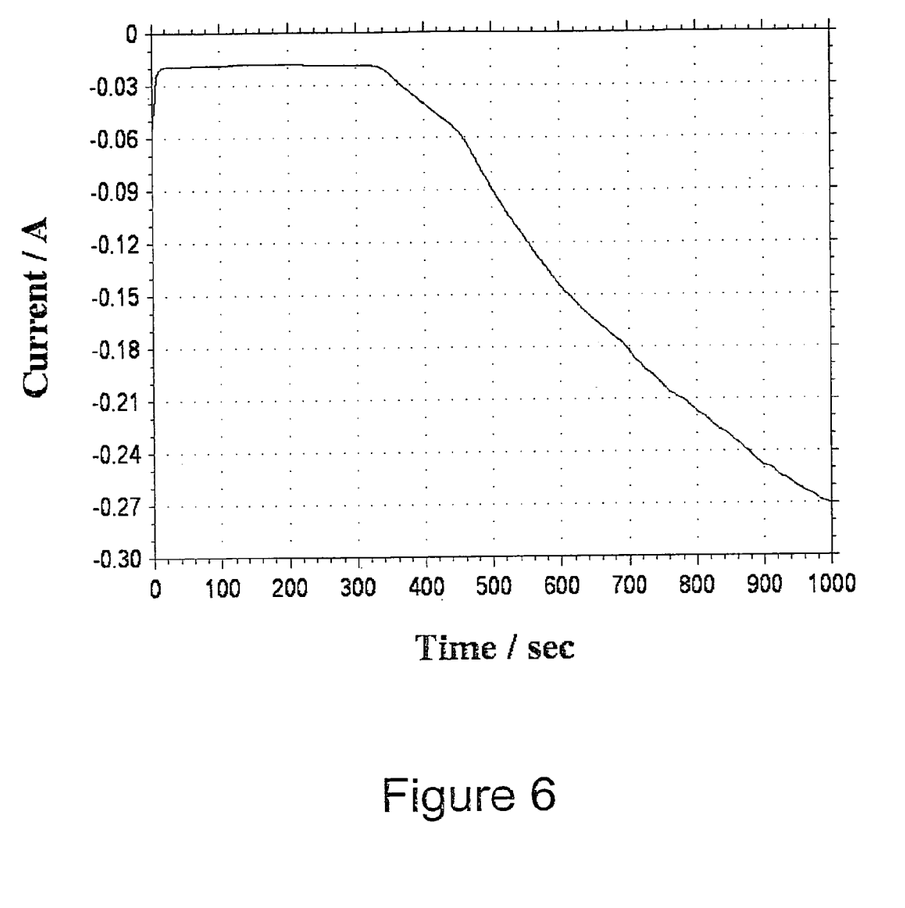
FIG. 6 is a graph of the current transient during Ni plating into an ion track etched membrane. Membrane pore size 15 nm, pore density 6·10$^8$ cm$^{-2}$, thickness 6 μm, diameter 47 mm. Plating bath: $Ni(H_2NSO_3)_2 \times 4H_2O$ (515 g/l)+$NiCl_2 \times 6H_2O$ (20 g/l)+$H_3BO_3$ (20 g/l). 22° C. Potential step from −0.350 V to −1.000 V vs Ag/AgCl.

This example deal specifically with a deposition into an ion-track etched membrane, which may be obtained commercially. In order to fill the pores with Ni, a 150-200 nm Au layer is sputtered on one side of an ion track etched membrane. The membrane is then placed on a sheet of gold, with the sputtered layer facing the sheet, and clamped between a glass filter cup top with an aluminum bottom piece. The nickel plating solution is introduced into the filter cup and Ni is plated into the membrane at constant potential. A typical current transient is shown in FIG. 6. Three regions can be distinguished. The fast current decay within the first few seconds is related to double layer charging after the potential step. The following constant current region corresponds to the growth of Ni nanowires in the pores. The current increase in the third region starts when the pores are completely filled and a Ni deposit is formed on the outer surface of the membrane. The plating is usually stopped just before the end of the constant current region (about 300 s in FIG. 6). It was found that placing a large Pt gauze counter electrode parallel to the membrane solves the problem with non-uniform Ni growth rate across the membrane, which is caused, apparently, by the large ohmic drop in solution.

Figure 8:
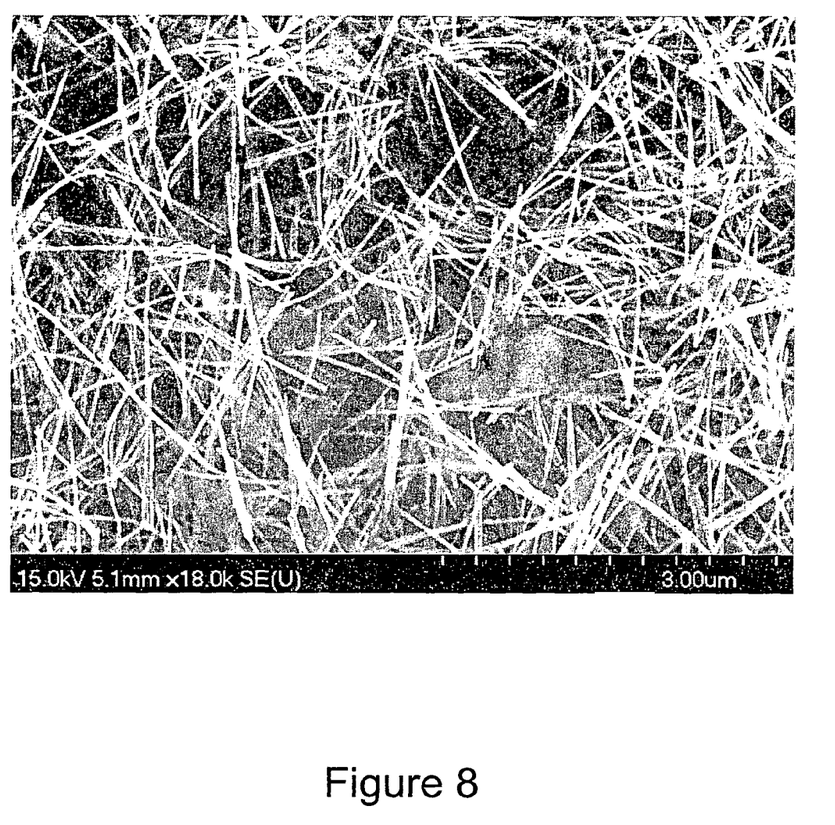
FIG. 8 is an SEM image of Ni nanowires produced by electroplating into ion-track etched polycarbonate membrane.

Most of the sputtered gold layer can be peeled off with a scotch tape, and the rest can be readily dissolved in a cyanide solution or in mercury, if needed. The Ni nanowires are released after the template dissolution. They are collected by centrifugation, rinsed and stored in ethanol. One run like the one shown in FIG. 6 results in 1.5 mg of 35 nm diameter×6 μm long non-bundled Ni nanowires from one ion-track etched polycarbonate membrane. The SEM image of the wires in shown in FIG. 8. Our procedure combines methods for electroplating of nanowires developed by Searson et al. (T. M. Whitney, J. S. Jiang, P. C. Searson, C. L. Chien; *Fabrication and Magnetic-Properties of Arrays of Metallic Nanowires*; Science 261 (1993) 1316-1319) and Mallouk et al. (M. L. Tian, J. U. Wang, J. Kurtz, T. E. Mallouk, M. H. W. Chan; *Electrochemical growth of single-crystal metal nanowires via a two-dimensional nucleation and growth mechanism*; Nano Lett. 3 (2003) 919-923).

Deposition of Pt Shell

Preparation of (sub)monolayers of noble metals on noble substrates (like Pt on Ru or vice versa) through spontaneous deposition or underpotential deposition exchange techniques is well known in the electrocatalysis community. However, these reactions are not suitable in the case of non-noble substrates because of the spontaneous cementation reaction, i.e. deposition of the noble metal and dissolution of the non-noble core. Since this is an electrochemical process, the deposition and dissolution can occur on spatially different areas of the conductive substrate, which results in destruction of the substrate shape. Recently a self-limiting decomposition reaction in a non-polar solvent was proposed to prepare a submonolayer of Ru on Pt. D. X. Cao, S. H. Bergens; *An organometallic deposition of ruthenium adatoms on platinum that self poisons at a specific surface composition. A direct methanol* fuel cell using a platinum-ruthenium adatom anode catalyst. J. Electroanal. Chem. 533 (2002) 91-100. Even though such conditions may suppress the cementation, it is not clear whether good quality mono- and multilayers can be prepared via this route.

Gas-phase deposition offers definite advantage in terms of the cementation problem. In this case it is also possible to control layer-by-layer growth using an Atomic Layer Deposition (ALD) technique. The ALD process consists of alternating cycles of precursor adsorption and decomposition. To generate a thin film, first a dose of the precursor vapor is brought to the surface of a substrate. Then, any excess non-adsorbed precursor is purged and pumped away. Next, a vapor dose of another reactant is used to decompose the adsorbed precursor, and the excess is purged and pumped away. One cycle normally deposits a monolayer or less of the material. ALD is reputed to generate reproducibly conformal coatings even in the case of high aspect ratio nanosubstrates.

The only published successful procedure for Pt ALD involves adsorption of ($\eta^5$-methylcyclopentadienyl)trimethylplatinum, (MeCp)PtMe$_3$, followed by the ligand oxidation with oxygen at 300° C. This procedure is not suitable for the present purpose since the Ni substrate will be oxidized under these conditions. Decomposition of (MeCp)PtMe$_3$ in the presence of H$_2$ occurs at a lower temperature, i.e. 90-250° C., which has been used in a conventional MOCVD of Pt. Considering the fact that the thermal decomposition of this precursor occurs only above 300° C., the use of H$_2$ as the reactant for the decomposition of (MeCp)PtMe$_3$ in Pt ALD seems well justified. During the MOCVD process, this precursor reacts cleanly with H$_2$ producing corresponding hydrocarbon ligands according to the following:

$$(MeCp)PtMe_3 + 4H_2 \rightarrow Pt + 3CH_4 + MeC_5H_9$$

It has been reported that this reaction requires long induction periods with Teflon and clean glass substrates. This type of complication is not expected when H$_2$-treated Ni is used for the adsorption of the precursor, since Ni is known to promote H$_2$ dissociation. On the other hand, the induction period could be beneficial, as it can prevent the Pt deposition on the walls of the reactor.

Other advantages of (MeCp)PtMe$_3$ are its commercial availability, the highest purity of Pt deposits produced compare to other precursors, and a high vapor pressure even at room temperature (0.053 Torr, nip 30° C.). A disadvantage is its sensitivity to air. In lieu of this the loading of the precursor into the source bottle may be performed in a glove box. It has been claimed that (EtCp)PtMe$_3$ is less sensitive to air and it is a liquid at room temperature and this may also be suitable for use in the present embodiments. Due to its higher cost though, it may not be preferred. Other contemplated precursors include, for example, ($\eta^5$-ethylcyclopentadienyl) trimethylplatinum, and ($\eta^{1.5}$-cyclooctadiene) dimethylplatinum.

Figure 7:
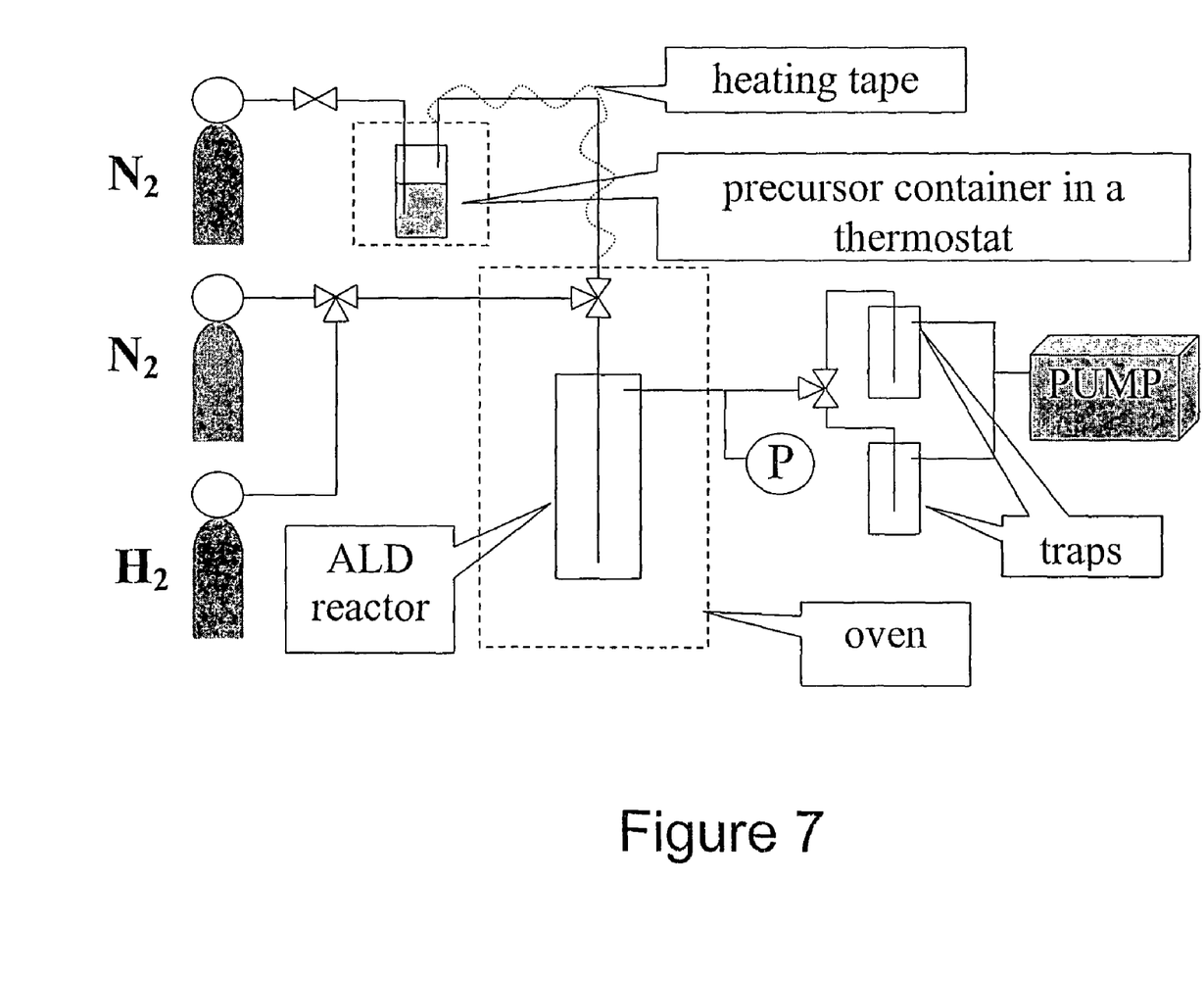
FIG. 7 is a schematic representation of an ALD system (not to scale).

The Pt ALD may be performed in the proposed all glass reactor shown in FIG. 7. This system consists of two nitrogen tanks (N$_2$), a H$_2$ tank (H$_2$) equipped with low pressure regulators, the platinum precursor container in a thermostat (14° C.), precursor delivery line wrapped with a heating tape (60° C.), an ALD reactor in an oven (90-180° C.), a pressure transducer (P), two cold traps (one used during adsorption step for the Pt precursor recycling, the other is used during the reduction step) and a rotary vane pump. The set up uses four vacuum valves may be controlled by commercial software via actuators, and several manual valves (not shown). Typical operating pressure is about 10 mbar.

The atomic layer deposition is preferably performed in a cold-wall glass or Teflon reactor, with the substrate temperature 25 to 300° C., preferably at 175° C. The purging times in the cycle can be 1s to 30 min, preferably 5 min for each step. Flow rates may vary between 0.1 to 100 cm/s, preferably 1 cm/s. The number of cycles can vary from one to over one hundred, preferably 5.

The novelty of the present approach is the use of the nanofabrication techniques, which were developed within the last decade, to address a crucial issue in a socially important technology. The proposed invention promises to open a new paradigm in the development of PEFCs with ultra-low Pt loading, which may reach the projected 2015 DOE goal of 15 g of Pt per car. It is not limited to one type of electrode, but encompasses all three main types of electrodes: oxygen (air) cathode, hydrogen, liquid- and vapor-fed methanol anodes, and, thus, is applicable to portable and stationary fuel cells as well.

The proposed design of the catalytic layer presents an integrated approach over three length scales: atomic (shell), nano- (core skeleton) and micro- (layer thickness). Thus, it is an example of the emerging field on nanocatalysis, which may be defined as an explicit design of a catalyst over length scales larger than a single active site.

The present embodiments will be used by us and others to develop better performing layers through modeling and synthetic advancements. Specific examples include the inverse opal structures (FIG. 5C), as well as Cr and Ti supports, which also show a promoting activity in O$_2$ reduction but are more stable in aqueous media due to the formation of passive oxide films.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claim is:

1. A nanostructured catalytic layer for use in fuel cells, the catalytic layer: comprising a porous nanostructured substrate made from a first material and a surface layer wherein the surface layer is a catalytic material and is a different material than said first material, and wherein the nanostructured catalytic layer is carbon-free and has a thickness of from 0.1 to 10 μm.

2. A catalytic layer according to claim 1, wherein said surface layer comprises at least a noble metal.

3. A catalytic layer according to claim 2, wherein said noble metal comprises a platinoid.

4. A catalytic layer according to 3, wherein a platinum loading in said catalyst layer is from 0.04 to 0.1 mg/cm$^2$.

5. A catalytic layer according to claim 1, further comprising an ion conductive electrolyte positioned in at least some of the pores in said substrate.

6. A catalytic layer according to claim 1, wherein said nanostructure comprises at least one of nanoparticles, nanowires, honeycombs, and inverse opals.

7. A catalytic layer according to claim 1, wherein said surface layer comprises platinum and a thickness of the surface layer on said substrate is from one to one hundred monolayers.

8. A catalytic layer according to claim 1, wherein a pore diameter of the nanostructure is from 3 to 300 nm.

9. A catalytic layer according to claim 1, wherein said first material comprises a first-row transition element, valve metal or coinage metal or a combination thereof.

10. A catalytic layer according to claim 1, wherein said catalytic layer is prepared by an atomic layer deposition process of a catalytic material on said nanostructured substrate.

11. A catalytic layer according to claim 10, wherein said atomic layer deposition process comprises the step of exposing a vapor of a catalytic material precursor to a surface of said substrate resulting in at least a portion of said vapor being adsorbed onto said surface, purging any non-adsorbed precursor away from said surface, exposing a gas reactant to said surface wherein said gas reactant will react with said adsorbed precursor, and purging any non-reacted reactant away from said surface.

12. A catalytic layer according to claim 11 wherein said precursor is ($\eta^5$-methylcyclopentadienyl)trimethylplatinum, or ($\eta^5$-ethylcyclopentadienyl)trimethylplatinum, or ($\eta^{1.5}$-cyclooctadiene)dimethylplatinum, and wherein said reactant is $H_2$.

* * * * *